United States Patent [19]
Ookouchi et al.

[11] Patent Number: 4,981,761
[45] Date of Patent: Jan. 1, 1991

[54] CERAMIC AND METAL BONDED COMPOSITE

[75] Inventors: Takahiko Ookouchi, Katsuta; Hiromi Kagohara, Hitachi, both of Japan

[73] Assignee: Hitachi, Ltd., Tokyo, Japan

[21] Appl. No.: 360,066

[22] Filed: May 31, 1989

[30] Foreign Application Priority Data

Jun. 3, 1988 [JP] Japan .................. 63-135416

[51] Int. Cl.⁵ .................. B32B 15/04; B32B 3/30
[52] U.S. Cl. .................. 428/594; 428/621; 428/627; 428/634; 428/671
[58] Field of Search ........... 428/594, 621, 627, 632, 428/633, 634, 671; 52/384, 385, 386, 596; 228/903, 263.12, 122

[56] References Cited

U.S. PATENT DOCUMENTS

| | | | |
|---|---|---|---|
| 3,284,176 | 11/1966 | Reed et al. | 428/633 |
| 4,251,018 | 2/1981 | Funk | 228/122 |
| 4,338,380 | 7/1982 | Erickson et al. | 228/122 |
| 4,610,934 | 9/1986 | Boecker et al. | 428/627 |
| 4,690,793 | 9/1987 | Hitachi et al. | 376/136 |

FOREIGN PATENT DOCUMENTS

| | | | |
|---|---|---|---|
| 111989 | 6/1984 | European Pat. Off. | 228/263.12 |
| 59-137378 | 8/1984 | Japan . | |
| 60-151285 | 8/1985 | Japan | 228/263.12 |
| 60-200870 | 10/1985 | Japan | 228/263.12 |
| 61-117170 | 6/1986 | Japan . | |
| 1139588 | 2/1985 | U.S.S.R. | 228/263.12 |
| 1215908 | 3/1986 | U.S.S.R. | 228/122 |
| 1431903 | 10/1988 | U.S.S.R. | 228/263.12 |

Primary Examiner—John J. Zimmerman
Attorney, Agent, or Firm—Antonelli, Terry, Stout & Kraus

[57] ABSTRACT

A ceramic and metal bonded composite comprising an intermediate metal plate interposed between a ceramic member and a metal member and brazed thereto, the intermediate metal plates carries on its juncture surface a central square projection having substantial area, pins arranged near the four corners and fins between the corners, the central square projection mechanically and thermally couples the ceramic member and the metal member together with the brazing layer and the pins and fins also mechanically and thermally couple the both members together with the brazing layer, while permitting relative displacement between the both members through their plastic deformation, thereby preventing crack generation in the ceramic member.

10 Claims, 1 Drawing Sheet

CERAMIC AND METAL BONDED COMPOSITE

The present invention relates to a ceramic and metal bonded composite and, in particular, relates to a ceramic and metal bonded composite having an excellent thermal conductivity, heat resistance and juncture strength suitable for an insulating wall required of a high thermal conductivity and heat resistance such as a wall for a combustion gas flowing magnetohydrodynamic (MHD) generator channels and a first wall for a nuclear fusion reactor which is exposed to a high temperature plasma.

BACKGROUND OF THE INVENTION

Since the thermal expansion coefficients of ceramics are smaller than those of metals, the ceramic and metal bonded composite has to include some measures to reduce, buffer or relax a strain caused in the ceramic member of the composite due to a thermal expansion difference between the ceramic member and the metal member.

U.S. Pat. No. 4,690,793 issued Sept. 1, 1987 discloses a ceramic and metal bonded composite first wall for a nuclear fusion reactor, wherein a copper clad carbon (Cu-C) fiber layer having an intermediate thermal expansion coefficient between those of ceramic and metal is interposed in the juncture surface of a ceramic tile and a metal substrate in order to buffer the strain caused in the ceramic tile due to their thermal expansion difference. However the heat resistance of the Cu-C fiber is as low as 350° C., an application of the disclosed composite wall under a high heat flux condition was impossible.

Japanese patent application Laid-Open No. 59-137378 (1984) discloses a ceramic and metal bonded composite, wherein the juncture surface of the metal plate is provided with plurality of two kinds of slits or grooves crossing each other so as to allow the slitted metal portion at the juncture a plastic deformation and to reduce the strain caused in the ceramic plate due to their thermal expansion difference. However the soldered contacting area of the metal plate to the ceramic plate of the disclosed composite is relatively small, the thermal conductivity of the composite as a whole as well as the bonding strength thereof are considered low.

Japanese patent application Laid-Open No. 61-117170 (1986) also discloses a ceramic and metal bonded composite, wherein five identical disc shaped metal plates are interposed between a ceramic plate and a metal plate, and one disc plate is disposed in the center of the juncture and the remaining four disc plates are disposed in the four corners of the juncture so as to reduce the strain caused in the ceramic plate due to their thermal expansion difference and to avoid generation of crack in the ceramic plate. However the displacement due to their thermal expansion difference is large at the corners, cracks may generate in the ceramic plate of the disclosed composite at its corners, because the strain thereat may exceed a withstandable level of the ceramic plate.

SUMMARY OF THE INVENTION

One object of the present invention is to provide a ceramic and metal bonded composite having a measure to prevent crack generation in the ceramic due to their thermal expansion coefficient difference as well as having a high heat resistance, a high thermal conductivity and a high thermal impact resistance under a high heat flux, for example, 300–500 W/cm$^2$.

The ceramic and metal bonded composite of the present invention includes an intermediate member interposed between the juncture of the ceramic member and the metal member and mechanically and thermally coupling the ceramic member and the metal member through a metallizing layer formed on the juncture surface of the ceramic member. The intermediate member is composed of a first portion having a predetermined contacting area to the both members and locating at the center of the juncture and a second portion surrounding the first portion and locating at the periphery of the juncture. The first portion mechanically and thermally couples the both members and the second portion thermally couples the both members and maintains a heat flow path between the both members while permitting relative displacement between the both members, thereby preventing the crack generation in the ceramic member of the composite due to the thermal expansion coefficient difference between the both members as well as enhancing the heat resistance, the thermal conductivity and the thermal impact resistance of the composite.

Examples of the ceramic member used in the present invention are oxide ceramics such as alumina and BeO and non-oxide ceramics such as SiC, SiN, AlN and BN. When the ceramic and metal bonded composite of the present invention is used under the condition which requires a high heat dissipation, the ceramic member therefor preferably has a thermal conductivity of not less than 100/m° C. As an example of such ceramic material is HITACERAM SC101 (Product of Hitachi, Ltd. SiC ceramic containing 1 wt % of BeO).

Examples of the metal member to be coupled to the ceramic member according to the present invention are Cu, Al, Ag and stainless steel (SUS).

The center contacting area where the ceramic member is bonded through the metallizing layer with the metal member by brazing material in the present invention is preferably as small as possible for the purpose of preventing the crack generation in the ceramic member due to the strain caused therein. The preferable center contacting area is not more than 2 cm$^2$ with respect to ceramics now available. The allowable center contacting area is not determined by the area size of the juncture surface defined by the ceramic member and the metal member, but is determined by the stress in the ceramic member at the center bonded portion which is caused by the strain due to thermal expansion difference of the ceramic member and the metal member and which is proportional to the distance from the center, thus the maximum stress is caused in the ceramic member at the periphery of the center bonded portion, so that an allowable area size of the center bonded portion is expressed by an absolute amount irrespective of the total size of the juncture surface of the composite. For example, in the case of combination of an SiC ceramic member and Cu metal member, when the central bonded portion of the juncture surface is not more than 2 cm$^2$, no cracking is produced, but when it is 4 cm$^2$ or more cracking is produced irrespective of the size of the juncture surface as a whole.

The metallizing material for forming the metallizing layer on the ceramic member according to the present invention varies depending on the ceramic material used but may be a conventional one. Examples of metallizing materials for oxide ceramics are W and Mo, which are particularly suitable for the composite used under a high temperature condition. Examples of metallizing materials for non-oxide ceramic are those containing Ti/Pt such as, for example, Ti/Pt/Au. Such a metallizing layer is formed on the ceramic member juncture surface by an ordinary method such as vacuum deposition.

The brazing material used in the present invention varies depending upon the use of the composite, however since the working temperature or the bonding temperature for forming the composite is ordinarily about 900° C., the brazing material is required to have a melting temperature lower than 900° C. and higher than the temperature at which the composite is used. Therefore, in some cases, it is possible to use a soft solder in place of the brazing material. Examples of the brazing materials are Ag-Cu, Au-Cu and Ni-Cu brazing materials each of which has a high heat resistance and a high bonding strength.

DESCRIPTION OF THE PREFERRED EMBODIMENTS

Figure 1:
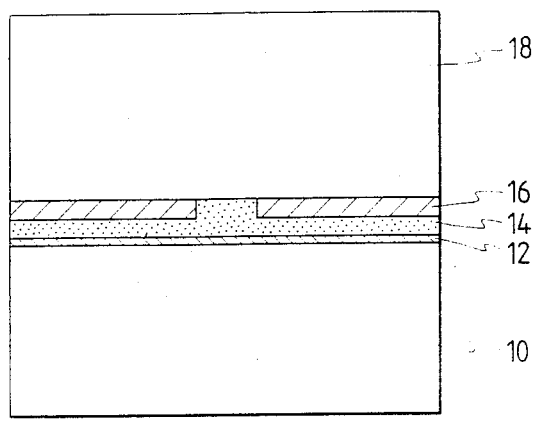
FIG. 1 is a cross sectional view of one embodiment of a ceramic-metal bonded composite according to the present invention.

In FIG. 1, a ceramic tile 10 of 22 mm × 22 mm and 10 mm thick and made of HITACERAM SC101 is provided with a metallizing layer 12 at its juncture surface. The thermal expansion coefficient and the thermal conductivity of HITACERAM SC101 are $3.7 \times 10^{-6}$/° C. and 270 W/m° C. The metallizing layer 12 is formed of Ti/Pt/Au metallizing material through vacuum deposition. The bonding strength of the metallizing layer 12 to the ceramic tile 10 was more than 5 kgf/mm$^2$, thereby providing a high reliability. A Cu metal block 18 is provided at its juncture surface, except for the central brazing portion, with a graphite layer 16. The thermal expansion coefficient and the thermal conductivity of the copper are $14 \times 10^{-6}$° C. and 401 W/m° C. respectively. The graphite layer 16 is formed by spray coating dry graphite carbon having particle diameter of 10-100Å to a thickness of 1 μm while masking the central juncture surface to be directly brazed.

The composite shown in FIG. 1 is completed in the following way by sandwiching an Au-Cu brazing foil having a thickness of 0.1 mm between the ceramic tile 10 provided with the metallizing layer 12 and the Cu metal block 18 provided with the graphite layer 16 and by heating to 810° C. in hydrogen, thereby forming a brazing layer 14 of Au-Cu which couples mechanically and thermally the ceramic tile 10 and the metal block 18. Since graphite has a good lubricating property or a slidability, the graphite layer 16 interposed in the juncture surface other than the central portion, permits relative displacement of the ceramic tile 10 and the metal block 18 without causing possible strain therein while maintaining a sufficient thermal conductivity of the resultant composite.

To ascertain the low strain, a high heat resistance, a high thermal conductivity and a high thermal impact resistance of the resultant composite, the face of the ceramic tile of the resultant composite was exposed to a heat flux of 400 W/cm$^2$, wherein the Cu metal block was continuously water-cooled, the temperature of the heat exposed ceramic surface became 700° C., but the temperature at the other ceramic surface, in that, the juncture surface was kept at 400° C., and no crack in the ceramic and no damage at the juncture were observed.

Figure 2:
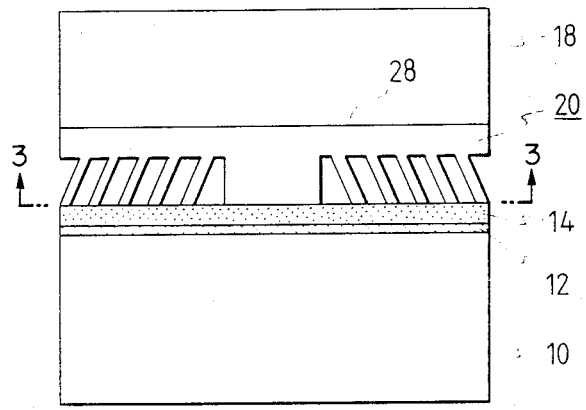
FIG. 2 is a cross sectional view of another embodiment of a ceramic-metal bonded composite according to the present invention. And, FIG. 3 is a cross sectional view taken from line III—III in FIG. 2.
Figure 3:
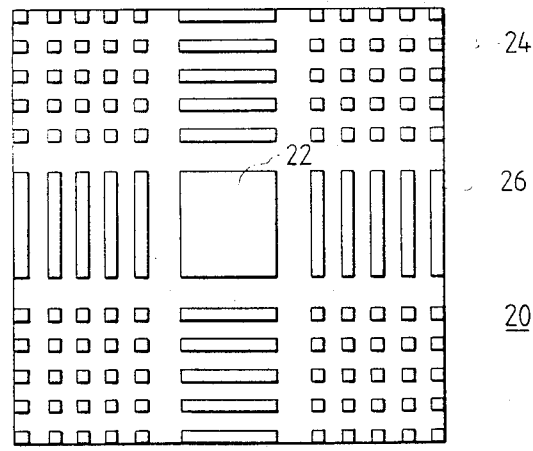

In FIGS. 2 and 3, the same numerals as in FIG. 1 designate same or equivalent elements as those explained with reference to FIG. 1, no specific explanation therefor is added. The ceramic and metal bonded composite shown in FIGS. 2 and 3 introduces an intermediate metal plate 20 in place of the graphite layer 16 in FIG. 1. The intermediate metal plate 20 of 22 mm × 22 mm is made of copper as same as the metal block 18 and carries a central square projection 22, four groups of pins 24 at the respective corners and four groups of fins 26 between the adjacent groups of pins 24. The areas of the central square projection, the pin 24 and the fin 26 are respectively 10 mm × 10 mm, 0.5 mm × 0.5 mm and 0.5 mm × 10 mm and all of the heights thereof are 1 mm long.

The central square projection 22, the pins 24 and the fins are formed on the juncture surface of the intermediate metal plate 20 by cutting grooves in accordance with the defined arrangement pattern of the central square projection 22, the pins 24 and the fins 26.

The fins 26 are arranged in parallel to the respective corresponding sides of the carrying metal plate 20 so as to facilitate plastic deformation caused by the thermal expansion difference between the ceramic tile 10 and the metal block 18.

The ratio of contacting area formed by the central square projection 22, the pins 24 and the fins 26 to the total juncture surface is about 50% which is preferable for maintaining a high thermal conductivity with the resultant composite.

The composite shown in FIGS. 2 and 3 is constructed in a similar manner as with the composite shown in FIG. 1, in that, the intermediate metal member 20 was placed between the ceramic tile 10 with the metallizing layer 14 and the metal block 18, while interposing Ag-Cu brazing foils respectively between the ceramic tile 10 and the metal plate 20 and between the metal plate 20 and the metal block 18, and the assembly was heated to 830° in hydrogen to form the brazing layers 14 and 28 and to complete the composite.

Since the bonding strength of Ag-Cu brazing layer is more than 10 kgf/mm$^2$, the bonding strength through the central square projection 22 of 10 mm × 10 mm is more than 1,000 kgf/cm$^2$ which is sufficient for the ceramic and metal bonded composite.

As seen from FIG. 2, after completion the pins 24 is plastically deformed so as to reduce the strain in the ceramic tile 10.

To ascertain the low strain, a high heat resistance, a high thermal conductivity and a high thermal impact resistance of the resultant composite, the same test as explained above in connection with the composite shown in FIG. 1 was performed on the resultant composite and substantially the same results as with the composite shown in FIG. 1 are obtained.

In the above embodiment, although the intermediate metal plate 20 is made of the same metal as the metal block 18, different metals having flexibility such as Ag, Ti and Al may be used. Moreover although the central square projection 22, the pins 24 and the fins 26 are formed on the separate intermediate metal plate 20, such may be formed directly on the juncture surface of the metal block 18.

We claim:

1. A ceramic and metal bonded composite comprising:
   a ceramic member;
   a metal member to be coupled to said ceramic member;
   a metallizing layer formed on said ceramic member facing toward said metal member; and
   an intermediate member mechanically and thermally coupling said ceramic member and said metal member through said metallizing layer, the thermal expansion coefficient and the thermal conductivity of said intermediate member being greater than those of said ceramic member;
   said intermediate member comprising a first portion having a predetermined surface area and being located at a center of a junction surface of said ceramic member and said metal member, and a second portion which is different from said first portion and surrounding the first portion and being located at a periphery portion of the juncture surface of said ceramic member and said metal member, the first portion of said intermediate member mechanically and thermally coupling said ceramic member and said metal member and the second portion of said intermediate member thermally coupling said ceramic member and said metal member while permitting relative displacement between said ceramic member and said metal member, thereby preventing crack generation in said ceramic member due to the thermal expansion coefficient difference between said ceramic member and said metal member.

2. The ceramic and metal bonded composite according to claim 1, wherein the first portion of said intermediate member is a solder layer and the second portion includes a graphite layer.

3. The ceramic and metal bonded composite according to claim 1, wherein the thermal conductivity of said ceramic member is not less than 100 W/m° C.

4. The ceramic and metal bonded composite according to claim 1, wherein said first portion of said intermediate layer comprises a central portion of a solder layer and the second portion of said intermediate layer includes a peripheral portion of the solder layer and said graphite layer, said graphite layer surrounding the central portion of the solder layer.

5. The ceramic and metal bonded composite according to claim 1, wherein said ceramic member comprises a SiC ceramic containing 1 wt. % of BeO; the metal member comprises a copper metal block; the metallizing layer comprises Ti/Pt/Au metallizing material and the intermediate member comprises a first portion comprising an Au-Cu brazing solder and a second portion comprising a graphite layer.

6. The ceramic and metal bonded composite according to claim 1, wherein said intermediate member includes a metal plate provided with, on its major surface facing toward said ceramic member, a central projection forming the first portion of said intermediate member and pins and/or fins forming the second portion of said intermediate member, the metal plate is soldered, respectively, to said metal member and to said ceramic member through said metallizing layer; the projection of said first portion having a bonding area larger than that of each of the pins and/or fins of said second portion.

7. The ceramic and metal bonded composite according to claim 6, wherein the pins are arranged near the respective corners of the metal plate included in said intermediate member.

8. The ceramic and metal bonded composite according to claim 6, wherein the fins are arranged in parallel to the respective corresponding sides of the metal plate included in said intermediate member.

9. A ceramic metal bonded composite according to claim 6, wherein the ceramic member is a SiC containing 1 wt. % of BeO, the metal member comprises a copper metal block; the metallizing layer comprises a Ti/Pt/Au metallizing material; and the intermediate member comprises a copper metal plate; said metal plate being soldered, respectively, to said metal member and to said ceramic member through said metallizing layer by interposing Ag-Cu brazing foils, respectively, between the plate and the copper metal block and between the plate and the metallizing layer on said ceramic member.

10. The ceramic and metal bonded composite according to claim 6, wherein an end portion of said central projection and end portions of said pins and/or fins facing said metallizing layer are soldered to said metallizing layer.

* * * * *